United States Patent
Agbabian (10) Patent No.: US 7,665,121 B1
(45) Date of Patent: Feb. 16, 2010

(54) MULTI-POLICY SECURITY AUDITING SYSTEM AND METHOD

(75) Inventor: Paul Agbabian, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 898 days.

(21) Appl. No.: 11/248,634

(22) Filed: Oct. 11, 2005

(51) Int. Cl.
*G06F 17/00* (2006.01)
*G06F 17/30* (2006.01)

(52) U.S. Cl. .................. 726/1; 726/10; 726/26

(58) Field of Classification Search .......... None
See application file for complete search history.

(56) References Cited

U.S. PATENT DOCUMENTS

| | | | |
|---|---|---|---|
| 5,956,400 A * | 9/1999 | Chaum et al. ............ 713/167 |
| 6,044,466 A * | 3/2000 | Anand et al. ............ 726/1 |
| 6,981,148 B1 * | 12/2005 | Jim et al. ............ 713/175 |
| 7,100,204 B1 * | 8/2006 | Myllymaki et al. ............ 726/22 |
| 2002/0066033 A1 * | 5/2002 | Dobbins et al. ............ 713/201 |

* cited by examiner

*Primary Examiner*—Kaveh Abrishamkar
(74) *Attorney, Agent, or Firm*—Gunnison, McKay & Hodgson, L.L.P.; Forrest Gunnison (57) ABSTRACT

A method includes running a set of policies simultaneously using two levels of optimizations. After selecting the policies to be run, the number of technical controls performed is minimized by coalescing (unioning) the technical controls of the policies in the first level of optimization. Further, the number of queries performed is minimized by coalescing (unioning) the queries of the technical controls in the second level of optimization. The technical controls and queries performed are determined by the set of polices that are to be run, in a policy driven manner.

19 Claims, 6 Drawing Sheets

UNION THE TECHNICAL CONTROLS AND QUERIES OF THE POLICIES OPERATION 206

MULTI-POLICY SECURITY AUDITING SYSTEM AND METHOD

BACKGROUND OF THE INVENTION

1. Field of the Invention

The present invention relates to the management of computer systems. More particularly, the present invention relates to a security auditing system and method.

2. Description of the Related Art

Security policy compliance products use queries to retrieve particular objects and attributes from a target system and compare the objects and attributes against a desired state. Depending upon the particular system, the cost of the queries is high, i.e., is resource intensive. Accordingly, it is desirable to minimize the number of queries.

SUMMARY OF THE INVENTION

In accordance with one embodiment, a method includes running a set of policies simultaneously using two levels of optimizations. After selecting the policies to be run, the number of technical controls performed is minimized by coalescing (unioning) the technical controls of the policies in the first level of optimization. Further, the number of queries performed is minimized by coalescing (unioning) the queries of the technical controls in the second level of optimization. The technical controls and queries performed are determined by the set of polices that are to be run, in a policy driven manner.

After invoking the queries and performing the desired state comparisons, the policies are reconstructed. By reconstructing the policies, security professionals and an auditor work at the policy level, i.e., the policies are maintained separately, which is direct and meaningful. More particularly, security professionals and the auditor can review the results of each policy on a policy by policy basis, e.g., can see if the policy was in compliance, and if not, the exceptions to the policy.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 2:
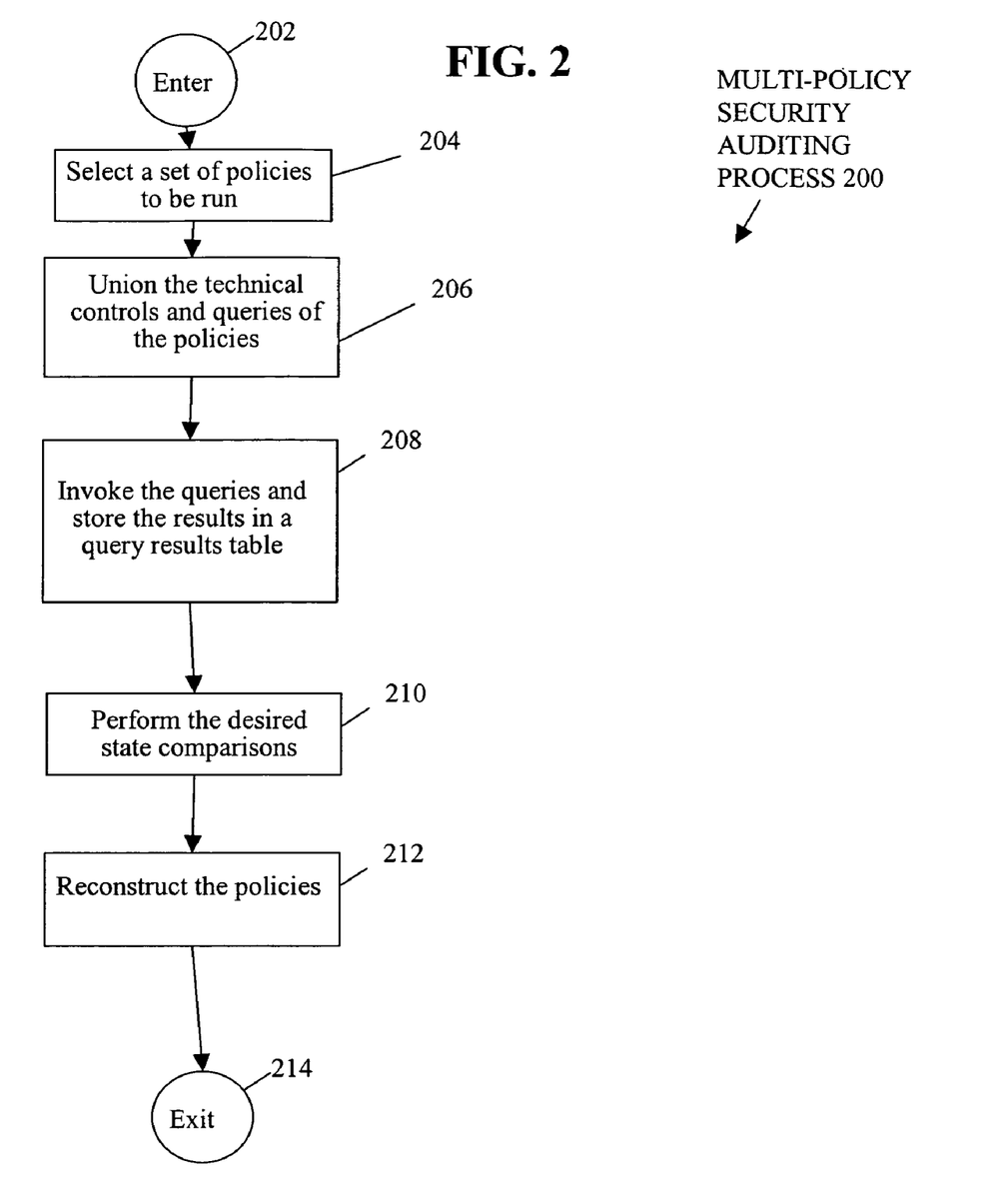
FIG. 2 is a flow diagram of a multi-policy security auditing process in accordance with one embodiment of the present invention.

In accordance with one embodiment, a set of policies are run simultaneously using two levels of optimizations. Referring to FIG. 2, after selecting the policies to be run (OPERATION 204), the number of technical controls performed is minimized by coalescing (unioning) the technical controls of the policies in the first level of optimization (OPERATION 206). Further, the number of queries performed is minimized by coalescing (unioning) the queries of the technical controls in the second level of optimization (OPERATION 206). The technical controls and queries performed are determined by the set of polices that are to be run, in a policy driven manner.

After invoking the queries and performing the desired state comparisons, the policies are reconstructed. By reconstructing the policies, security professionals and an auditor work at the policy level, i.e., the policies are maintained separately, which is direct and meaningful. More particularly, security professionals and the auditor can review the results of each policy on a policy by policy basis, e.g., can see if the policy was in compliance, and if not, the exceptions to the policy.

Figure 1:
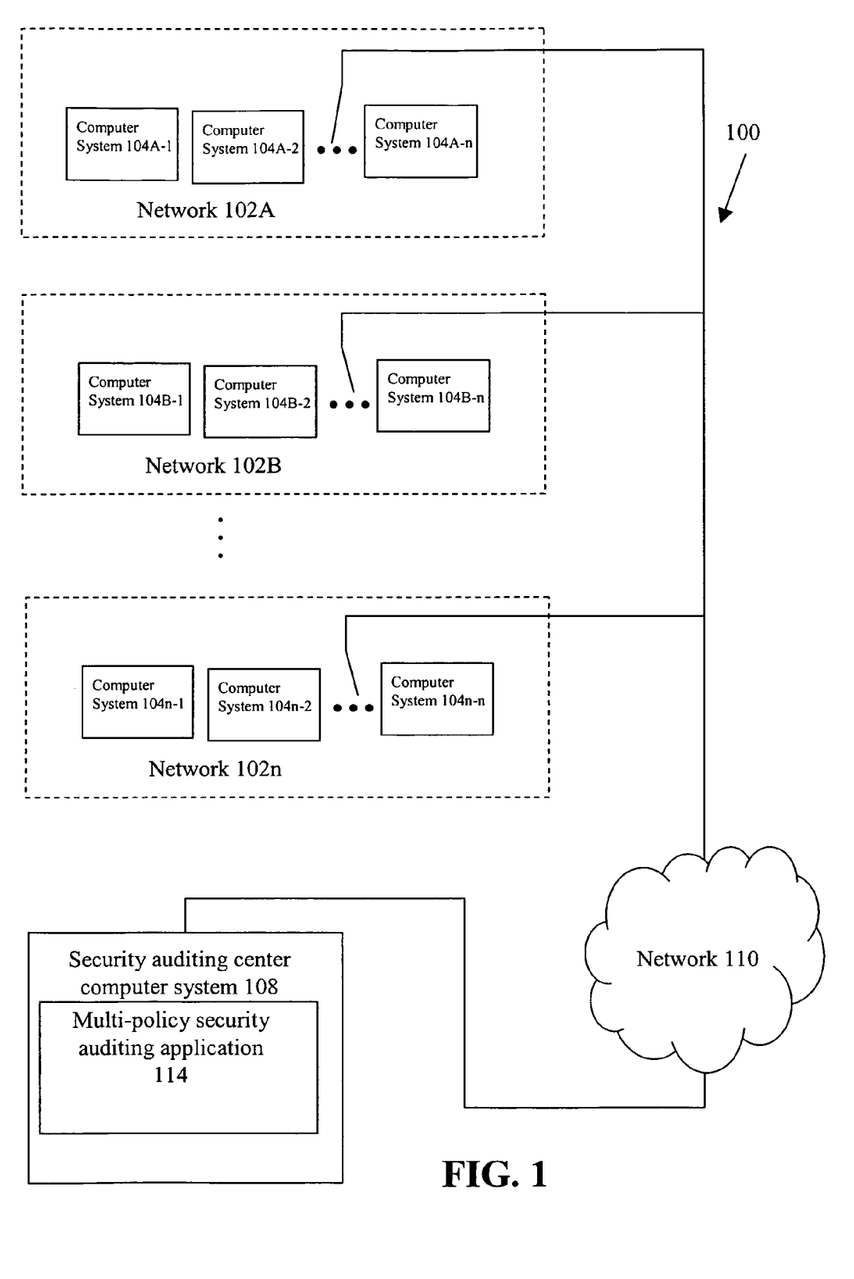
FIG. 1 is a diagram of a computer system that includes a plurality of networks in accordance with one embodiment of the present invention.

More particularly, FIG. 1 is a diagram of a computer system 100 that includes a plurality of networks 102A, 102B, . . . , 102n, collectively networks 102, in accordance with one embodiment of the present invention. Referring to network 102A, network 102A includes a plurality of interconnected computer systems 104A-1, 104A-2, . . . , 104A-n, collectively computer systems 104A.

Similarly, networks 102B, . . . , 102n also include a plurality of interconnected computer systems 104B-1, 104B-2, . . . , 104B-n, . . . , 104n-1, 104n-2, . . . , 104n-n, respectively. Computer systems 104B-1, 104B-2, . . . , 104B-n, . . . , 104n-1, 104n-2, . . . , 104n-n, are collectively referred to as computer systems 104B, . . . , 104n, respectively.

Networks 102, and, more particularly, computer systems 104 are coupled to a security auditing center computer system 108 by a network 110. Network 110 is any network or network system that is of interest to a user. Security auditing center computer system 108 includes a multi-policy security auditing application 114. In one embodiment, security auditing center computer system 108 including multi-policy security auditing application 114 is used to audit compliance of computer system(s) 104 and/or network(s) 102 with multiple security policies.

Figure 3:
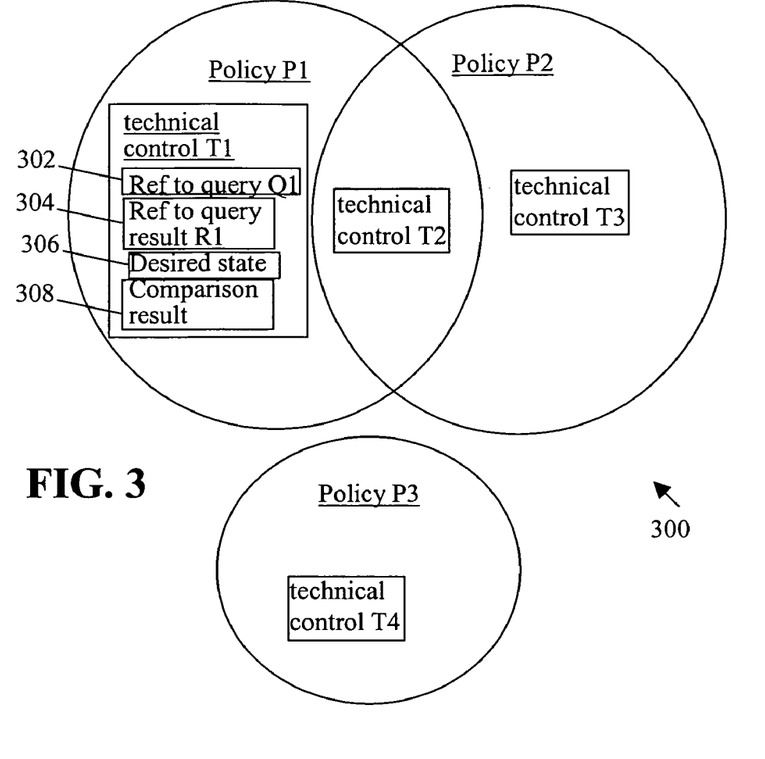
FIG. 3 is Venn diagram of policies in accordance with one embodiment of the present invention.

FIG. 2 is a flow diagram of a multi-policy security auditing process 200 in accordance with one embodiment of the present invention. Execution of a multi-policy security auditing application on security auditing center computer system 108 and/or computer system(s) 104 results in the operations of multi-policy security auditing process 200 as described below in one embodiment. FIG. 3 is Venn diagram 300 of policies P1, P2, P3 in accordance with one embodiment of the present invention.

Referring now to FIGS. 2 and 3 together, from an ENTER OPERATION 202, flow moves to a SELECT A SET OF POLICIES TO BE RUN OPERATION 204. In SELECT A SET OF POLICIES TO BE RUN OPERATION 204, a set of policies, i.e., more than one policy, is selected to be run. Illustratively, a policy compliance audit requires that multiple policies are run to determine if the policies are in compliance or non-compliance. The policy compliance audit, sometimes called a policy run, has a run ID in one embodiment. Generally, a policy run is the performance of the technical controls of the policies selected to be run.

Generally, a policy, sometimes called a security policy, includes at least one technical control. To illustrate, a policy may include two technical controls. The first technical control requires that all passwords be greater than eight characters. The second technical control requires that only administrators are in the administrators group. Any one of a number of policies can be selected, e.g., HIPAA, Sarbanes-Oxley, FISMA, OS Best Practices, and/or customer specific policies.

As shown in FIG. 3, policy P1 includes first and second technical controls T1, T2. Policy P2 includes second and third technical controls T2, T3. Technical control T2 of policy P1 is identical with technical control T2 of policy P2. Policy P3 includes a fourth technical control T4.

A technical control includes four parts: 1) a reference to a query; 2) a reference to a query results; 3) a desired state; and 4) a comparison results. A query is either runnable code or a rule that drives a rule engine. Generally, a query retrieves particular objects and/or attributes from a target system.

To illustrate, technical control T1 includes: 1) a reference to a query 302; 2) a reference to a query result 304; 3) a desired state 306; and 4) a comparison result 308. Technical controls T2, T3, T4 also include: 1) a reference to a query; 2) a reference to a query result; 3) a desired state; and 4) a comparison result in a manner similar to technical control T1 and so are not illustrated in detail in FIG. 3 for purposes of clarity.

A technical control is sometimes called a check. However, a technical control is operating system independent whereas a check is the particular implementation of a technical control on a particular operating system. To continue with the above illustration, the first technical control requires that all passwords be greater than eight characters whereas a corresponding check is the particular technique used to determine on a Windows® operating system that a password is over eight characters as an example.

Thus, returning to FIG. 2, in this illustration, policies P1, P2, P3 are selected to be run in SELECT A SET OF POLICIES TO BE RUN OPERATION 204.

From SELECT A SET OF POLICIES TO BE RUN OPERATION 204, flow moves to a UNION THE TECHNICAL CONTROLS AND QUERIES OF THE POLICIES OPERATION 206. In UNION THE TECHNICAL CONTROLS AND QUERIES OF THE POLICIES OPERATION 206, the technical controls and queries of the policies are coalesced (unioned) as discussed in greater detail with reference to FIG. 4.

Figure 4:
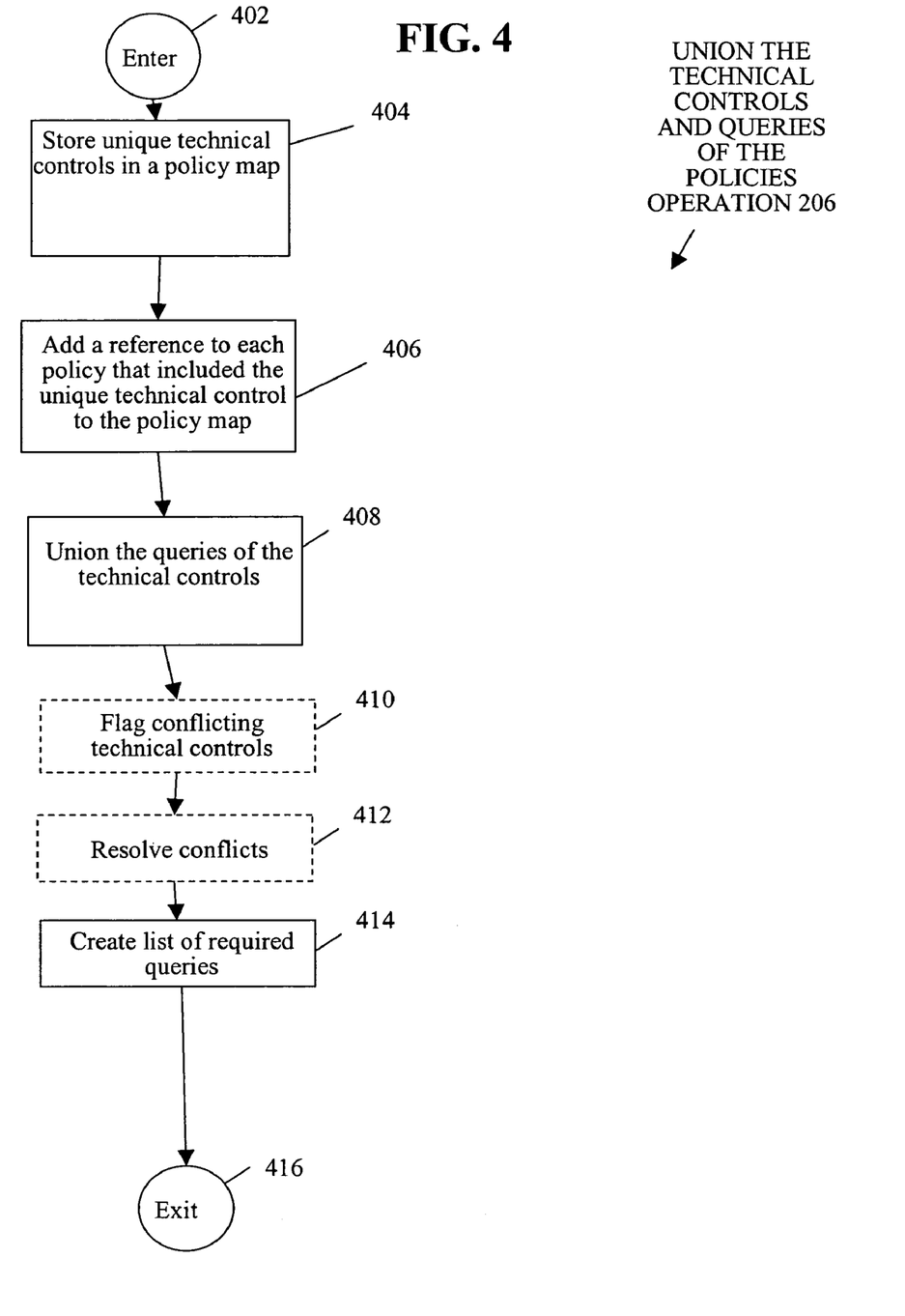
FIG. 4 is a flow diagram of a UNION THE TECHNICAL CONTROLS AND QUERIES OF THE POLICIES OPERATION of the multi-policy security auditing process of FIG. 2 in accordance with one embodiment of the present invention.

FIG. 4 is a flow diagram of UNION THE TECHNICAL CONTROLS AND QUERIES OF THE POLICIES OPERATION 206 of multi-policy security auditing process 200 of FIG. 2 in accordance with one embodiment of the present invention. Referring now to FIG. 4, from an ENTER OPERATION 402 (and from SELECT A SET OF POLICIES TO BE RUN OPERATION 204 of FIG. 2), flow moves to a STORE UNIQUE TECHNICAL CONTROLS IN A POLICY MAP OPERATION 404. In STORE UNIQUE TECHNICAL CONTROLS IN A POLICY MAP OPERATION 404, each unique technical control is stored in a policy map. The policy map corresponds to the policy run. In one embodiment, a unique technical control is a one and only technical control, i.e., a technical control of which there are no other identical technical controls.

Figure 5:
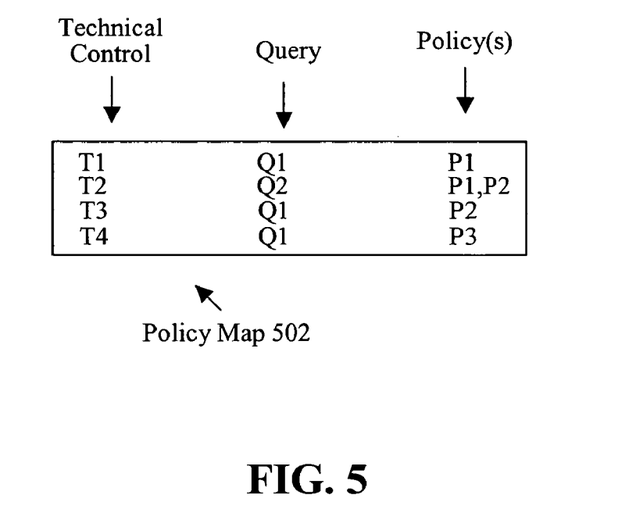
FIG. 5 is a policy map in accordance with one embodiment of the present invention.

To illustrate, FIG. 5 is a policy map 502 in accordance with one embodiment of the present invention. Referring now to FIGS. 3, 4 and 5 together, policy map 502 includes technical controls T1, T2, T3, and T4. Technical controls T1, T2, T3, and T4 are added to policy map 502 in STORE UNIQUE TECHNICAL CONTROLS IN A POLICY MAP OPERATION 404.

As discussed above, policy P1 and policy P2 include technical control T2. Stated another way, policy P1 and policy P2 each include an instance of technical control T2. However, technical control T2 is a unique technical control and thus is added to policy map 502 only once. A unique technical control that appears in a policy is sometimes called an instance of the unique technical control.

From STORE UNIQUE TECHNICAL CONTROLS IN A POLICY MAP OPERATION 404, flow moves to an ADD A REFERENCE TO EACH POLICY THAT INCLUDED THE UNIQUE TECHNICAL CONTROL TO THE POLICY MAP OPERATION 406. In ADD A REFERENCE TO EACH POLICY THAT INCLUDED THE UNIQUE TECHNICAL CONTROL TO THE POLICY MAP OPERATION 406, a reference to each policy that included the unique technical control is added to the policy map. The combination of a unique technical control and the associated policy(s) make up a distinct entry in the policy map.

For example, as discussed above, a technical control may appear in more than one policy. Accordingly, a reference to each policy in which the technical control appears is added to the policy map and associated with the technical control.

To illustrate, technical controls T1, T2 appear in policy P1. Accordingly, a reference to policy P1 is added to technical controls T1, T2 in policy map 502. Similarly, technical controls T2, T3 appear in policy P2. Accordingly, a reference to policy P2 is added to technical controls T2, T3 in policy map 502. Note with respect to technical control T2, which appears in both policy P1 and policy P2, references to policies P1, P2 is added to technical control T2 in policy map 502. Further, technical control T4 appears in policy P3. Accordingly, a reference to policy P3 is added to technical control T4 in policy map 502.

From ADD A REFERENCE TO EACH POLICY THAT INCLUDED THE UNIQUE TECHNICAL CONTROL TO THE POLICY MAP OPERATION 406, flow moves to a UNION THE QUERIES OF THE TECHNICAL CONTROLS OPERATION 408. In UNION THE QUERIES OF THE TECHNICAL CONTROLS OPERATION 408, the queries of the technical controls are unioned (coalesced). In one embodiment, the queries are stored in a list, each with an ID, and the technical control(s) store references to the query by the query identification (ID). Thus, a technical control is sometimes discussed herein as having a query, however, it is to be understood that a technical control contains a reference to a query, e.g., contains a query ID.

Figure 6:
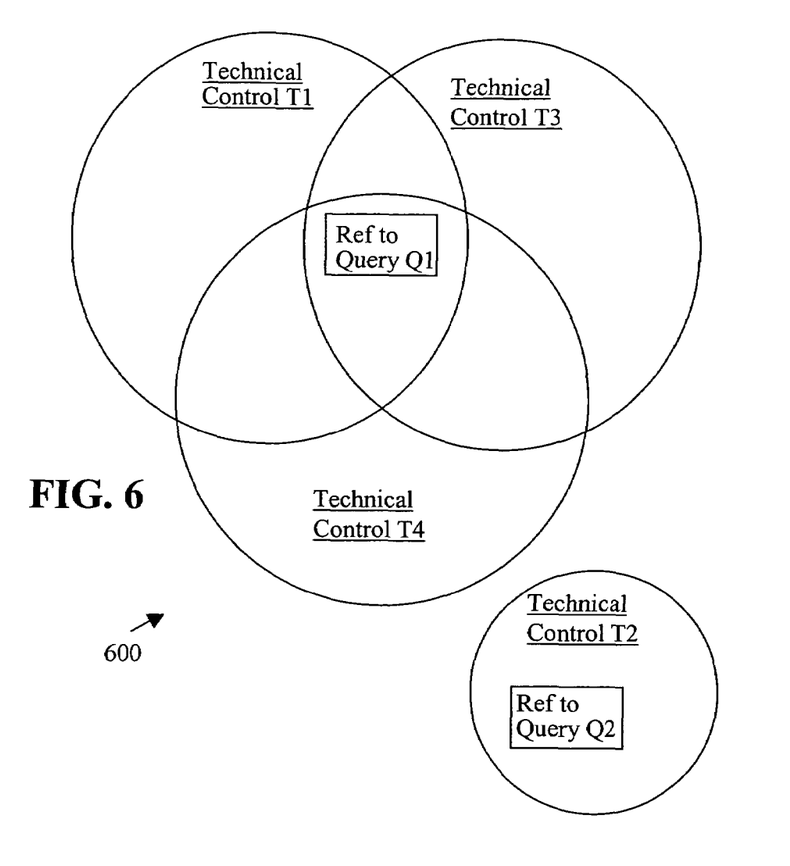
FIG. 6 is Venn diagram of technical controls in accordance with one embodiment of the present invention.

FIG. 6 is Venn diagram 600 of technical controls T1, T2, T3, T4 in accordance with one embodiment of the present invention. As shown in FIG. 6, technical controls T1, T3 and T4 include a reference to a first query Q1. Technical control T2 includes a reference to a second query Q2.

To illustrate, technical control T1 requires that all passwords be greater in length than eight characters. Technical control T3 requires that all passwords include a dollar ($) sign. Technical control T4 requires that all passwords be less in length than seven characters. Although each of technical controls T1, T3 and T4 are unique, the underlying query Q1 is the same. Specifically, query Q1 retrieves the passwords.

Technical control T2 requires that only administrators are in the administrators group. Accordingly, query Q2 retrieves the administrators group.

Referring now to FIGS. 4, 5, and 6, in one embodiment, the query associated with each technical control is added to policy map 502. To illustrate, queries Q1, Q2, Q1, and Q1 associated with technical controls T1, T2, T3, and T4, respectively, are added to policy map 502. Each unique query is retrieved from policy map 502 in UNION THE QUERIES OF THE TECHNICAL CONTROLS OPERATION 408. In one embodiment, a unique query is a one and only query, i.e., a query of which there are no other identical queries. In accordance with the example set forth above, queries Q1 and Q2 are retrieved from policy map 502 in UNION THE QUERIES OF THE TECHNICAL CONTROLS OPERATION 408.

From UNION THE QUERIES OF THE TECHNICAL CONTROLS OPERATION 408, flow moves, optionally, to a FLAG CONFLICTING TECHNICAL CONTROLS OPERATION 410. In FLAG CONFLICTING TECHNICAL CONTROLS OPERATION 410, conflicting technical controls are flagged or otherwise identified. In one embodiment, a conflicting technical control is a technical control that conflicts with another technical control and has the same query. A technical control conflicts with another technical control if both technical controls cannot be simultaneously satisfied. Conflicting technical controls can occur between different policies or within the same policy.

To illustrate, technical control T1 requires that all passwords be greater in length than eight characters. Further, technical control T4 requires that all passwords be less in length than seven characters. Of course, a password cannot be both greater in length than eight characters and less in length than seven characters. Accordingly, technical controls T1 and T4 cannot be simultaneously satisfied and have the same query and so are conflicting technical controls. Thus, technical controls T1 and T4 are flagged in FLAG CONFLICTING TECHNICAL CONTROLS OPERATION 410.

From FLAG CONFLICTING TECHNICAL CONTROLS OPERATION 410, flow moves, optionally, to a RESOLVE CONFLICTS OPERATION 412. In RESOLVE CONFLICTS OPERATION 412, the conflicting technical controls flagged in FLAG CONFLICTING TECHNICAL CONTROLS OPERATION 410 are resolve. In one embodiment, a system administrator or user resolves the conflicts either allowing or reconciling the conflicts.

To continue with the above illustration, a system administrator or user resolves conflicting technical controls T1 and T4. For example, technical control T4 is removed thus reconciling the conflicting technical controls. In another example, both of technical controls T1 and T4 are allowed thus allowing the conflicting technical controls.

During conflict resolution, one or more technical controls and/or queries are removed in one embodiment. From RESOLVE CONFLICTS OPERATION 412, flow moves to a CREATE LIST OF REQUIRED QUERIES OPERATION 414.

It another embodiment, RESOLVE CONFLICTS OPERATION 412 is not performed and thus is an optional operation. In accordance with this embodiment, conflicting technical controls are flagged in FLAG CONFLICTING TECHNICAL CONTROLS OPERATION 410 and flow moves to CREATE LIST OF REQUIRED QUERIES OPERATION 414.

In another embodiment, FLAG CONFLICTING TECHNICAL CONTROLS OPERATION 410 and RESOLVE CONFLICTS OPERATION 412 are both not performed and thus are optional operations. In accordance with this embodiment, flow moves from UNION THE QUERIES OF THE TECHNICAL CONTROLS OPERATION 408 directly to CREATE LIST OF REQUIRED QUERIES OPERATION 414.

In CREATE LIST OF REQUIRED QUERIES OPERATION 414, a list of the required queries is created. In one embodiment, the list of required queries is the queries unioned in UNION THE QUERIES OF THE TECHNICAL CONTROLS OPERATION 408. It another embodiment, the list of required queries is the queries unioned in UNION THE QUERIES OF THE TECHNICAL CONTROLS OPERATION 408 minus the queries removed during RESOLVE CONFLICTS OPERATION 412. To continue at the above illustration, the list of required queries includes queries Q1 and Q2.

From CREATE LIST OF REQUIRED QUERIES OPERATION 414, flow moves to and exits at an EXIT OPERATION 416 and returns to INVOKE THE QUERIES AND STORE THE RESULTS IN A QUERY RESULTS TABLE OPERATION 208 of FIG. 2.

Figure 7:
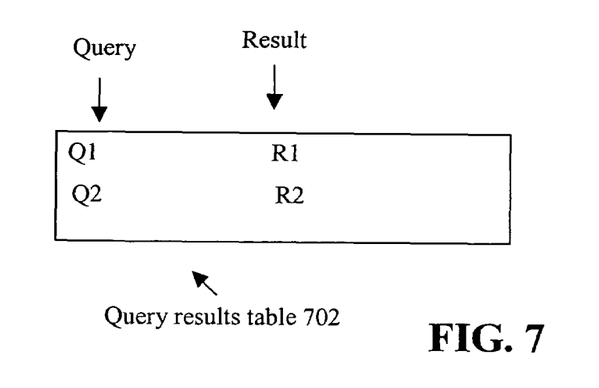
FIG. 7 is a query results table in accordance with one embodiment of the present invention.

FIG. 7 is a query results table 702 in accordance with one embodiment of the present invention. Query results table 702 in accordance with this embodiment includes the list of required queries (queries Q1 and Q2 in the example set forth above) and the associated query results (query results R1 and R2 associated with queries Q1 and Q2, respectively). In one embodiment, the query results are the resulting objects and attributes of the target computer system retrieved by the query.

Referring now to FIGS. 2 and 7 together, in INVOKE THE QUERIES AND STORE THE RESULTS IN A QUERY RESULTS TABLE OPERATION 208, the queries are invoked and the results of the queries are stored in a query results table.

For example, a set forth above, query Q1 retrieves the passwords. Thus, query Q1 is invoked and the passwords are retrieves. The query result R1, e.g., passwords, is stored in query results table 702. Further, query Q2 retrieves the administrators group. Thus, query Q2 is invoked and the administrators group is retrieved. The query result R2, e.g., the administrators group, is stored in query results table 702.

By invoking each unique query only once, the query operation is performed at maximum speed and utilizes minimum resources compared to repeatedly performing the same query. More generally, the number of queries performed is minimized optimizing the multi-policy run.

To illustrate, query Q1 is only invoked once. As should be readily apparent, invoking query Q1 only once is faster and uses less resources compared to invoking query Q1 a first time for technical control T1, a second time for technical control T3 and a third time for technical control T4.

Further, query results are stored separately from the technical controls. This avoids redundantly storing the query results. To illustrate, for query Q1, query result R1 is stored in query results table 702. This is in contrast to storing query result R1 a first time for technical control T1, a second time for technical control T3 and a third time for technical control T4.

From INVOKE THE QUERIES AND STORE THE RESULTS IN A QUERY RESULTS TABLE OPERATION 208, flow moves to a PERFORM THE DESIRED STATE COMPARISONS OPERATION 210. In PERFORM THE DESIRED STATE COMPARISONS OPERATION 210, the desire state comparisons are performed. Illustratively, each query result is compared to a desired state to determine if the query result is in compliance or noncompliance with the desired state. If the query result is not in compliance with the desired state, the technical control is an exception to the policy(s) containing the technical control.

To continue with the above example, the passwords are retrieved when query Q1 is invoked and the administrators group is retrieved when query Q2 is invoked. For technical control T1, a determination is made as to whether each password has a length greater than eight characters. For technical control T3, a determination is made as to whether each password contains a dollar sign ($). For technical control T4, a determination is made as to whether each password has a length less than seven characters. For technical control T2, a determination is made as to whether the administrators group contains only administrators.

By performing the desired state comparison only once, e.g., by performing each unique technical control only once, the state comparison is performed at maximum speed and utilizes minimum resources compared to repeatedly performing the same state comparison. More generally, the number of technical controls performed is minimized optimizing the multi-policy run.

To illustrate, technical control T2 is only performed once. As should be readily apparent, performing technical control T2 only once is faster and uses less resources compared to performing technical control T2 a first time for policy P1 and a second time for policy P2.

From PERFORM THE DESIRED STATE COMPARISONS OPERATION 210, flow moves to a RECONSTRUCT THE POLICIES OPERATION 212. In RECONSTRUCT THE POLICIES OPERATION 212, the policies are reconstructed. Recall that in SELECT A SET OF POLICIES TO BE RUN OPERATION 204, a set of policies was selected to be run. Further, in ADD A REFERENCE TO EACH POLICY THAT INCLUDED THE UNIQUE TECHNICAL CONTROL TO THE POLICY MAP OPERATION 406, a reference to each policy that included the technical control was added to the policy map.

Accordingly, in one embodiment, the policy map is used to reconstruct the policies. To illustrate, referring to FIGS. 3 and 5 together, in policy map 502, references to policy P1, policies P1, P2, policy P2, and policy P3 were added to technical controls T1, T2, T3, and T4, respectively. Thus, using policy map 502, each technical control is applied (set) to the appropriate policy, i.e., technical controls T1, T2, T3, and T4 are applied to policy P1, policies P1, P2, policy P2, and policy P3, respectively. From RECONSTRUCT THE POLICIES OPERATION 212, flow moves to and exits at an EXIT OPERATION 214.

Thus, as set forth above, a set of policies are run simultaneously using two levels of optimizations. First, the number of technical controls performed is minimized. Second, the number of queries is minimized. The technical controls and queries performed are determined by the set of polices that are to be run, in a policy driven manner.

Further, by reconstructing the policies, security professionals and an auditor work at the policy level, i.e., the policies are maintained separately, which is direct and meaningful. More particularly, security professionals and the auditor can review the results of each policy on a policy by policy basis, e.g., can see if the policy was in compliance, and if not, the exceptions to the policy.

Figure 8:
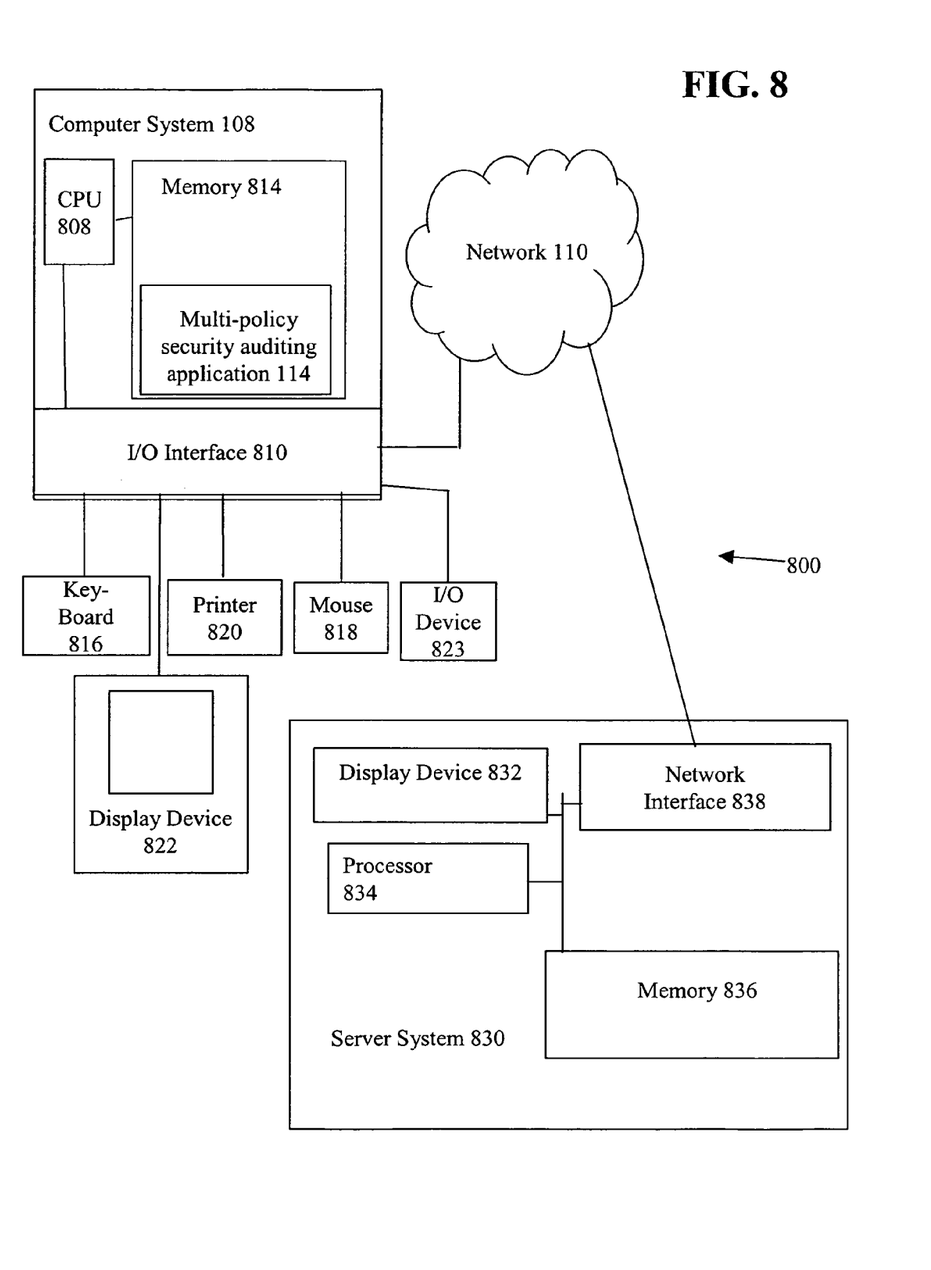
FIG. 8 is a diagram of a client-server system that includes a multi-policy security auditing application executing on a computer system in accordance with one embodiment of the present invention.

FIG. 8 is a diagram of a client-server system 800 that includes a multi-policy security auditing application 114 executing on a computer system 108, e.g., a first computer system, in accordance with one embodiment of the present invention. Referring now to FIGS. 1 and 8 together, computer system 108 is representative of a computer system 104 and/or security auditing center computer system 108 of FIG. 1 in one embodiment. Further, client-server system 800 is part of computer system 100 (FIG. 1) in one embodiment.

Computer system 108, sometimes called a client or user device, typically includes a central processing unit (CPU) 808, hereinafter processor 808, an input output (I/O) interface 810, and a memory 814. Computer system 108 may further include standard devices like a keyboard 816, a mouse 818, a printer 820, and a display device 822, as well as, one or more standard input/output (I/O) devices 823, such as a compact disk (CD) or DVD drive, floppy disk drive, or other digital or waveform port for inputting data to and outputting data from computer system 108. In one embodiment, multi-policy security auditing application 114 is loaded into computer system 108 via I/O device 823, such as from a CD, DVD or floppy disk containing multi-policy security auditing application 114.

Computer system 108 is coupled to a server system 830 of client-server system 800 by network 110. Server system 830 typically includes a display device 832, a processor 834, a memory 836, and a network interface 838.

Network 110 can be any network or network system that is of interest to a user. In various embodiments, network interface 838 and I/O interface 810 include analog modems, digital modems, or a network interface card.

Multi-policy security auditing application 114 is stored in memory 814 of computer system 108 and executed on computer system 108. The particular type of and configuration of computer system 108 and server system 830 are not essential to this embodiment of the present invention.

Multi-policy security auditing application 114 is in computer memory 814. As used herein, a computer memory refers to a volatile memory, a non-volatile memory, or a combination of the two.

Although multi-policy security auditing application 114 is referred to an application, this is illustrative only. Multi-policy security auditing application 114 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, execution of multi-policy security auditing application 114 by processor 808 results in the operations of multi-policy security auditing process 200.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 8, this medium may belong to the computer system itself. However, the medium also may be removed from the computer system. For example, multi-policy security auditing application 114 may be stored in memory 836 that is physically located in a location different from processor 808. Processor 808 should be coupled to the memory 836. This could be accomplished in a client-server system, or alternatively via a connection to another computer via modems and analog lines, digital interfaces and a digital carrier line, or wireless or cellular connections.

More specifically, in one embodiment, computer system 108 and/or server system 830 is a portable computer, a workstation, a two-way pager, a cellular telephone, a smart phone, a digital wireless telephone, a personal digital assistant, a server computer, an Internet appliance, or any other device that includes components that can execute the multi-policy security auditing functionality in accordance with at least one of the embodiments as described herein. Similarly, in another embodiment, computer system 108 and/or server system 830 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the multi-policy security auditing functionality in accordance with one embodiment of the present invention can be implemented in a wide variety of computer system configurations. In addition, the multi-policy security auditing functionality could be stored as different modules in memories of different devices. For example, multi-policy security auditing application 114 could initially be stored in server system 830, and then as necessary, a portion of multi-policy security auditing application 114 could be transferred to computer system 108 and executed on computer system 108. Consequently, part of the multi-policy security auditing functionality would be executed on processor 834 of server system 830, and another part would be executed on processor 808 of computer system 108. In view of this disclosure, those of skill in the art can implement various embodiments of the present invention in a wide-variety of physical hardware configurations using an operating system and computer programming language of interest to the user.

In yet another embodiment, multi-policy security auditing application 114 is stored in memory 836 of server system 830. Multi-policy security auditing application 114 is transferred over network 110 to memory 814 in computer system 108. In this embodiment, network interface 838 and I/O interface 810 would include analog modems, digital modems, or a network interface card. If modems are used, network 110 includes a communications network, and multi-policy security auditing application 114 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
    executing a multi-policy security auditing application on a computer processor, wherein said executing includes:
        selecting a set of security policies to be run;
        unioning technical controls of said set of security policies to generate a set of technical controls wherein each technical control in said set is unique and further wherein a unique technical control is a technical control of which there are no other identical technical controls; and
        unioning queries of said set of technical controls to generate a set of queries wherein each query in said set of queries is unique and further wherein a unique query is a query of which there are no other identical queries.

2. The computer implemented method of claim 1 further comprising invoking each query in said set of queries.

3. The computer implemented method of claim 2 further comprising storing query results of said invoked queries in a queries results table.

4. The computer implemented method of claim 3 further comprising comparing said query results to desired states.

5. The computer implemented method of claim 4 wherein said comparing said query results to desired states comprises determining whether said query results are in compliance with said desired states.

6. The computer implemented method of claim 4 further comprising reconstructing said policies.

7. The computer implemented method of claim 6 wherein said reconstructing said policies comprises using a policy map, said policy map comprising:
    said set of unique technical controls of said technical controls;
    queries of said set of unique technical controls; and
    references to policies that included said unique technical controls.

8. The computer implemented method of claim 7 further comprising setting each of said unique technical controls to policies to which said each of said unique technical controls is referenced.

9. The computer implemented method of claim 1 wherein each of said policies comprises at least one of said technical controls.

10. The computer implemented method of claim 1 wherein each of said technical controls comprises:
    a reference to one of said queries;
    a reference to a query result;
    a desired state; and
    a comparison result.

11. The computer implemented method of claim 1 wherein said unioning technical controls of said policies comprises storing unique technical controls of said technical controls in a policy map.

12. The computer implemented method of claim 11 wherein a first policy of said policies comprises a first instance of a unique technical control and a second policy of said policies comprises a second instance of said unique technical control, said storing unique technical controls of said technical controls in a policy map comprises adding said unique technical control to said policy map only once.

13. The computer implemented method of claim 11 further comprising adding a reference to each of said policies that include a unique technical control to said policy map.

14. The computer implemented method of claim 11 further comprising flagging technical controls that conflict.

15. The computer implemented method of claim 14 further comprising resolving said technical controls that conflict.

16. The computer implemented method of claim 15 further comprising creating a list of required queries.

17. A computer system comprising:
    a memory having stored therein a multi-policy security auditing application; and
    a processor coupled to said memory, wherein execution of said multi-policy security auditing application generates a method comprising:
        selecting a set of security policies to be run;
        unioning technical controls of said set of security policies to generate a set of technical controls wherein each technical control in said set is unique and further wherein a unique technical control is a technical control of which there are no other identical technical controls; and
        unioning queries of said set of technical controls to generate a set of queries wherein each query in said set of queries is unique and further wherein a unique query is a query of which there are no other identical queries.

18. A computer-program product comprising a computer readable medium containing computer program code comprising:
- a multi-policy security auditing application for selecting a set of security policies to be run;
- said multi-policy security auditing application further for unioning technical controls of said set of security policies to generate a set of technical controls wherein each technical control in said set is unique and further wherein a unique technical control is a technical control of which there are no other identical technical controls; and
- said multi-policy security auditing application further for unioning queries of said set of technical controls to generate a set of queries wherein each query in said set of queries is unique and further wherein a unique query is a query of which there are no other identical queries.

19. A computer system comprising:
- means for selecting a set of security policies to be run;
- means for unioning technical controls of said set of security policies to generate a set of technical controls wherein each technical control in said set is unique and further wherein a unique technical control is a technical control of which there are no other identical technical controls; and
- means for unioning queries of said set of technical controls to generate a set of queries wherein each query in said set of queries is unique and further wherein a unique query is a query of which there are no other identical queries.

* * * * *